US007233939B1

(12) United States Patent
Ziauddin

(10) Patent No.: US 7,233,939 B1
(45) Date of Patent: Jun. 19, 2007

(54) SYSTEMS AND METHODS OF OPTIMIZING DATABASE QUERIES FOR EFFICIENT DELIVERY OF QUERY DATA SUBSETS

(75) Inventor: Mohamed Ziauddin, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 362 days.

(21) Appl. No.: 10/137,235

(22) Filed: Apr. 30, 2002

(51) Int. Cl.
*G06F 17/30* (2006.01)
(52) U.S. Cl. .............................. 707/2; 707/3
(58) Field of Classification Search .................... 707/2, 707/3, 102, 104.1
See application file for complete search history.

(56) References Cited

U.S. PATENT DOCUMENTS

| | | | | |
|---|---|---|---|---|
| 6,330,552 B1 * | 12/2001 | Farrar et al. | .................... | 707/2 |
| 6,341,281 B1 * | 1/2002 | MacNicol et al. | ............. | 707/3 |
| 6,615,203 B1 * | 9/2003 | Lin et al. | ....................... | 707/3 |
| 6,754,652 B2 * | 6/2004 | Bestgen et al. | ................. | 707/3 |
| 2002/0198867 A1 * | 12/2002 | Lohman et al. | ................. | 707/3 |
| 2003/0120682 A1 * | 6/2003 | Bestgen et al. | .......... | 707/104.1 |

OTHER PUBLICATIONS

Carey, Michael J., et al., "Processing Top N and Bottom N Queries," Bulletin of the Technical Committee on Data Engineering (Sep. 1997), vol. 20, No. 3, pp. 12-19.
Carey, Michael J., et al., "Reducing the Braking Distance of an SQL Query Engine," Proceedings of the 24th VLDB Conference (Sep. 1998), pp. 158-169.
Donjerkovic, Donko et al., "Probabilistic Optimization of Top N Queries," Proceedings of the 25th VLDB Conference (Sep. 1999), pp. 411-422.

* cited by examiner

*Primary Examiner*—Leslie Wong
(74) *Attorney, Agent, or Firm*—Bingham McCutchen LLP

(57) ABSTRACT

Queries are optimized according to a first optimization mode by generating execution plans and selecting the lowest cost plan. Inputs optimized according to the first optimization mode, to database operations with input parameters that are inconsistent with the first optimization mode, are replaced with equivalent inputs optimized according to a second optimization mode, the second optimization mode being consistent with the input parameter. Blocking operations are eliminated from queries using a cost-based approach.

35 Claims, 12 Drawing Sheets

```
GET T1
GET T2
GET T3
JOIN T1,T2
JOIN T2,T3
SELECT T1.X, T2.X
SORT T1.X
```

910

```
GET T1 INDEX
FETCH INDEX ROWS
GET T2
GET T3
JOIN T1 INDEX,T2
JOIN T2,T3
SELECT T1.X, T2.X
```

930

```
GET T1
SORT T1.X
GET T2
GET T3
JOIN T1,T2
JOIN T2,T3
SELECT T1.X, T2.X
```

920

```
GET T1
GET T2
GET T3
JOIN T1,T2
JOIN T2,T3
SELECT T1.X, T2.X
GET T1 INDEX
JOIN (SELECT T1.X, T2.X), T1 INDEX
```

SYSTEMS AND METHODS OF OPTIMIZING DATABASE QUERIES FOR EFFICIENT DELIVERY OF QUERY DATA SUBSETS

FIELD OF THE INVENTION

The invention relates to the field of computer systems, and more particularly to methods of optimizing database operations.

BACKGROUND AND SUMMARY OF THE INVENTION

Modern database management systems (DBMS) process ever-increasing amounts of data. These database systems can store millions of data records. When accessing large databases, it is important to minimize the amount of time the database access takes, to ensure efficient and speedy operation of the database management system. Most large-scale database management systems use some form of optimization scheme, to ensure that operations executed on the DBMS, such as database queries, are executed as efficiently as possible.

In a database management system, optimization is the process of choosing an efficient way to execute a database query or manipulation action. Examples of such query or manipulation actions include searching, retrieving, modifying, organizing, adding, and/or deleting information from the database. These database query/manipulation actions are normally initiated by submitting commands to a database server in a database query language. One popular database query language is known as the Structured Query Language ("SQL"). For the purposes of explanation only, and not by way of limitation, the following description is made with particular reference to database statements involving SQL.

To execute a database query language statement (e.g., a SQL statement), the database system may have to perform various database operations involving the retrieval or manipulation of data from various database structures, such as tables and indexes. Examples of database operations include table scans, index lookups, data sorting, data grouping and/or aggregation, etc. Often, there exists many alternate ways to execute the SQL statement. For example, a single SQL statement can be executed in different ways by varying the order in which tables and indexes are accessed to execute the statement. The exact combination and order of database operations taken to execute the SQL statement can drastically change the efficiency or speed of execution for the statement. The combination and order of database operations that are used to execute a SQL statement is referred to as an "execution plan."

As an example, consider the following SQL statement, which queries for the name of all employees having a salary equal to 100 from a database table "emp_table":

SELECT employee_name
FROM emp_table
WHERE salary=100

A first execution plan could include a database operation that performs a full table scan of emp_table to execute the query. This first execution plan would retrieve every row from emp_table to identify particular rows that match the WHERE clause. Alternatively, if an index exists for the "salary" column of emp_table, then a second execution plan could involve a first database operation that accesses the index to identify rows that match the WHERE clause, and a second database operation that retrieves only those identified rows from the table. The index is considered an alternate access path to the data sought by the SQL statement.

Each execution plan has a "cost" that is associated with its execution. The cost of an execution plan can be expressed in terms of the resources that are consumed to execute the SQL statement using that execution plan. For example, the cost of an execution plan can be expressed in units of I/O usage, CPU usage, network usage, or memory usage.

An "optimizer" is used by a database system to choose what is believed to be the most efficient execution plan for a SQL statement. A "cost-based" optimizer bases its decision upon the costs of each execution plan. The cost-based optimizer typically generates a set of potential execution plans for the SQL statement based upon available access paths for the data sought to be operated upon by that statement. The cost is then estimated for each execution plan based upon, for example, data distribution and storage characteristics for database structures holding relevant data for the SQL statement. The optimizer then compares relative costs of the execution plans to choose the one with the smallest cost. This is typically done by adding up the total cost for each plan, and choosing the plan with the smallest sum.

One form of cost-based optimization is response time optimization. This form of optimization seeks to optimize a query to produce a result set in a minimum or near minimum amount of time. The optimizer selects the execution plan that is estimated to produce the desired result set in the minimal amount of time. There are various modes of response time optimization, including "all rows" and "first rows" modes. In all rows optimization mode, a query is optimized so that the estimated time to produce the full results set is minimized. In first rows optimization mode, a query is optimized so that the estimated time to produce an initial subset of the full results set is minimized, even if this causes the estimated time to produce the full results set to no longer be a minimum. All rows optimization mode is used where it is more important to return the entire results set quickly, for example, to generate reports and batch job query results sets. First rows optimization mode is used where it is more important to display an initial subset of the query results set, for example, to generate results sets for web-based or form-based online queries.

When optimizing a query according to a first rows optimization mode, conventional optimizers encounter difficulties in optimizing some classes of database operations. There are classes of database operations that have input parameters which are inconsistent with the first rows optimization mode. For example, there is a class of database operations, known as "blocking operations," which consume all of their input data before producing any output data. Sort operations, for example, consume the entire data set to be sorted, sort the data, and only then start producing sorted output data. These blocking operations impose a "wait" condition on the execution of a query, while they load their input data. This wait condition is inconsistent with the first rows optimization mode, since it prevents the optimizer from delivering any rows of output before all rows of input have been consumed. Because of this wait condition, blocking operations are frequently, but not always, non-optimal when optimizing according to a first rows optimization mode. When doing first rows optimization, therefore, conventional optimizers eliminate blocking operations in the execution plans, by replacing them with equivalent non-blocking operations.

In some situations, however, the equivalent non-blocking operation has a higher execution cost than the blocking operation. Thus the conventional optimizer actually generates a sub-optimal execution plan by eliminating the blocking operation. This occurs because conventional optimizers do not take the relative costs of using the blocking and non-blocking operations into account when making a decision to replace one with the other. Conventional optimizers merely apply a fixed rule that replaces blocking operations with equivalent non-blocking operations. Therefore, systems and methods are needed to optimize queries containing blocking operations and other similar classes of database operations according to a cost-based optimization scheme.

BRIEF DESCRIPTION OF THE DRAWINGS

FIG. 9 is a representation of the database operations used in a variety of execution plans.

DETAILED DESCRIPTION OF THE PREFERRED EMBODIMENTS

Figure 1:
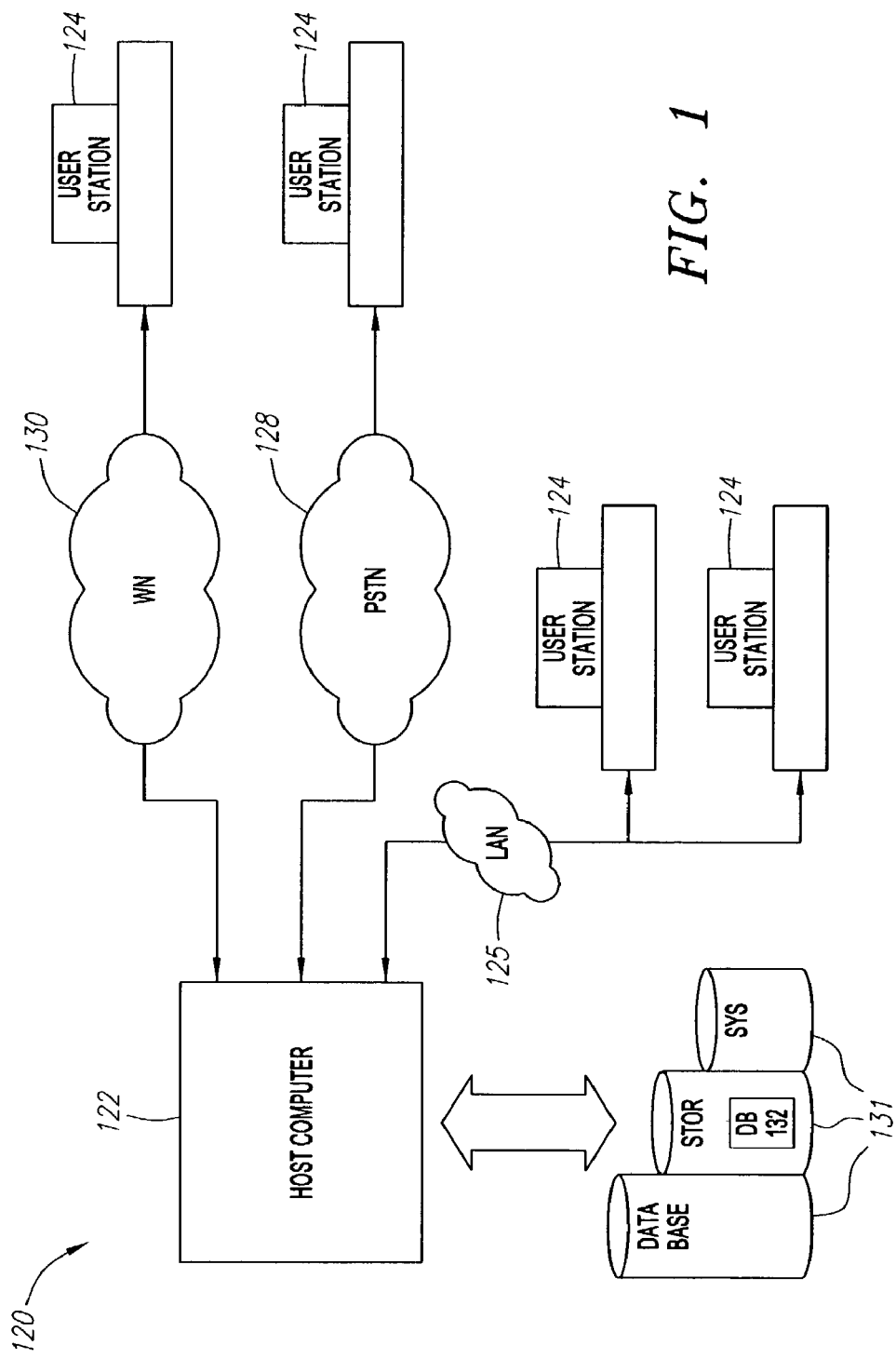
FIG. 1 is a representation of a computer system in accordance with an embodiment of the invention.

Referring to FIG. 1, a computer system 120 constructed in accordance with one preferred embodiment of the present invention includes a host computer 122 connected to a plurality of individual user stations 124. The user stations 124 each comprise suitable data terminals, such as, e.g., personal computers, portable laptop computers, or personal data assistants ("PDAs"), which can store and independently run one or more applications, i.e., programs. For purposes of illustration, some of the user stations 124 are connected to the host computer 122 via a local area network ("LAN") 125. Other user stations 124 are remotely connected to the host computer 122 via a public telephone switched network ("PSTN") 128 and/or a wireless network 130.

The host computer 122 operates in conjunction with a data storage system 131, which contains a database 132 that is readily accessible by the host computer 122. In alternative embodiments, the database 132 may be resident on the host computer, stored, e.g., in the host computer's ROM, PROM, EPROM, or any other memory chip, and/or its hard disk. In yet alternative embodiments, the database 132 may be read by the host computer 122 from one or more floppy disks, flexible disks, magnetic tapes, any other magnetic medium, CD-ROMs, any other optical medium, punchcards, papertape, or any other physical medium with patterns of holes, or any other medium from which a computer can read. In further alternative embodiments, the host computer 122 can access two or more databases 132, stored in a variety of mediums, as previously discussed.

Figure 2:
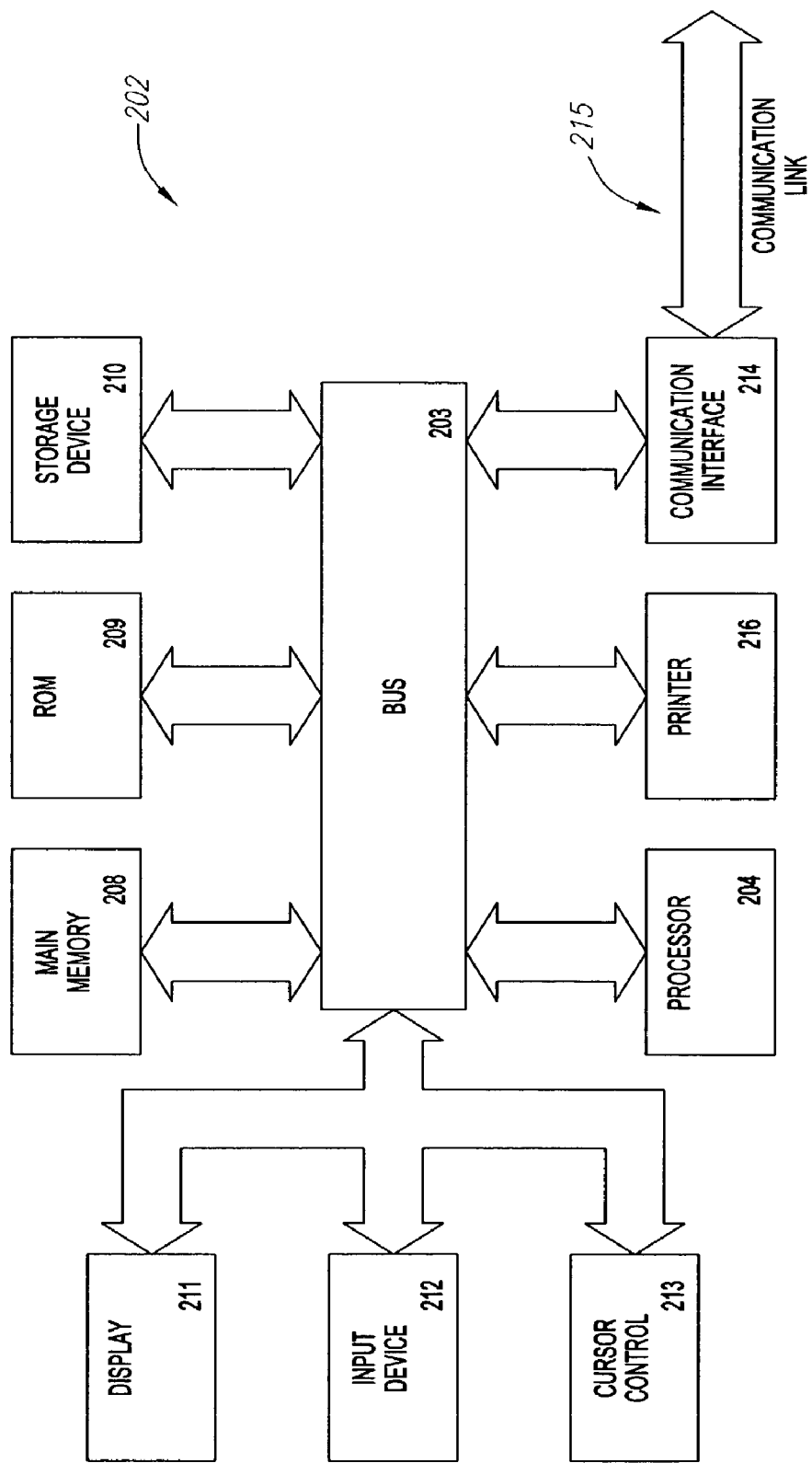
FIG. 2 is a representation of a processing unit used in the computer system of FIG. 1.

Referring to FIG. 2, each user station 124 and the host computer 122 can be referred to generally as a processing unit 202. The processing unit 202 includes a bus 203 or other communication mechanism for communicating instructions, messages and data, collectively, information, and one or more processors 204 coupled with the bus 203 for processing information. The processing unit 202 also includes a main memory 208, such as a random access memory (RAM) or other dynamic storage device, coupled to the bus 203 for storing dynamic data and instructions to be executed by the processor(s) 204. The main memory 208 also may be used for storing temporary data, i.e., variables, or other intermediate information during execution of instructions by the processor(s) 204.

The processing unit 202 further includes a read only memory (ROM) 209 or other static storage device coupled to the bus 203 for storing static data and instructions for the processor(s) 204. A storage device 210, such as a magnetic disk or optical disk, is also provided and coupled to the bus 203 for storing data and instructions for the processor(s) 204. An output device such as a printer 216 is also provided and coupled to the bus 203, for outputting information to the user.

The processing unit 202 is also coupled via the bus 203 to a display device 211, such as, but not limited to, a cathode ray tube (CRT), for displaying information to a user. An input device 212, including alphanumeric and other keys, is coupled to the bus 203 for communicating information and command selections to the processor(s) 204. Another type of user input device may include a cursor control 213, such as, but not limited to, a mouse, a trackball, a fingerpad, or cursor direction keys, for communicating direction information and command selections to the processor(s) 204 and for controlling cursor movement on the display 211.

The individual processing units 202 perform specific operations by their respective processor(s) 204 executing one or more sequences of one or more instructions contained in the main memory 208. Such instructions may be read into the main memory 208 from another computer-usable medium, such as the ROM 209 or the storage device 210. Execution of the sequences of instructions contained in the main memory 208 causes the processor(s) 204 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 204. Such a medium may take many forms, including, but not limited to, non-volatile, volatile and transmission media. Non-volatile media, i.e., media that can retain information in the absence of power, includes the ROM 209. Volatile media, i.e., media that can not retain information in the absence of power, includes the main memory 208. Transmission media includes coaxial cables, copper wire and fiber optics, including the wires that comprise the bus 203. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 204 can retrieve information.

Various forms of computer-usable media may be involved in providing one or more sequences of one or more instructions to the processor(s) 204 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 203 may receive the infrared signals and place the instructions therein on the bus 203. The bus 203 may carry the instructions to the main memory 208, from which the processor(s) 204 thereafter retrieves and executes the instructions. The instructions received by the main memory 208 may optionally be stored on the storage device 210, either before or after their execution by the processor(s) 204.

Each processing unit 202 also includes a communication interface 214 coupled to the bus 203. The communication interface 214 provides two-way communication between the processing units 202 (such as, e.g., between a user station 124 and the host computer 122) via a communication link 215. The communication interface 214 of a respective processing unit 202 transmits and receives electrical, electromagnetic or optical signals that include data streams representing various types of information, including instructions, messages and data.

The communication link 215 may be a LAN 125, in which case the communication interface 214 may be a LAN card. Alternatively, the communication link 215 may be a PSTN 128, in which case the communication interface 214 may be an integrated services digital network (ISDN) card or a modem. In addition, as a further alternative, the communication link 215 may be a wireless network 130.

Each processing unit 202 transmits and receives messages, data, and instructions, including program, i.e., application, code, through its respective communication link 215 and communication interface 214. Received program code may be executed by the respective processor(s) 204 as it is received, and/or stored in the storage device 210, or other associated non-volatile media, for later execution. In this manner, a processing unit may receive messages, data and/or program code in the form of a carrier wave.

The computer system 120 runs a database management system (DBMS). The database management system is responsible for managing access to the database 132 by various entities. These entities include, for example, users of the host computer 122 or the user stations 124, or other computer programs running on the host computer 122 or the user stations 124. The entities access the database 132 by, for example, submitting queries on the data contained in the database 132.

Figure 3:
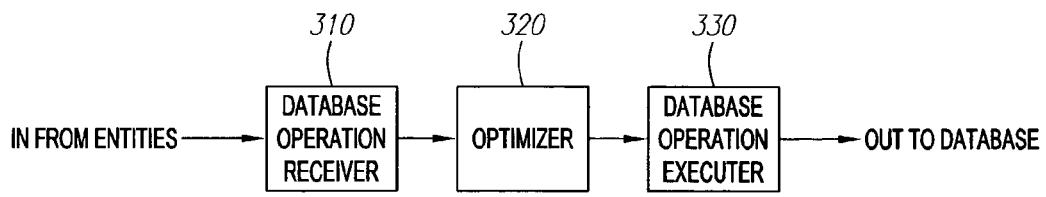
FIG. 3 is a representation of a system for optimizing a database operation.

Turning to FIG. 3, the DBMS includes an optimizer 320, which optimizes the queries prior to their being executed on the database 132. The DBMS further includes a database operation receiver 310 that receives database operations from the entities, and passes the database operations to the optimizer. The DBMS further includes a database operation executor 330 that receives the optimized database operations from the optimizer and executes them on the data stored in the database 132.

Figure 4:
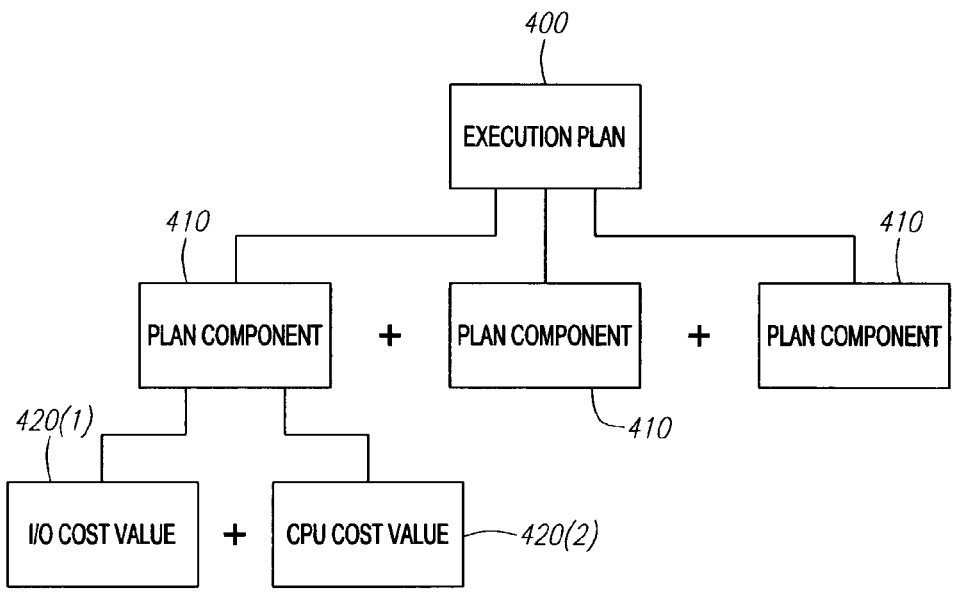
FIG. 4 is a representation of an execution plan produced by an optimizer running on the computer system of FIG. 1.

Turning to FIG. 4, these queries are optimized by generating a plurality of execution plans 400, and selecting the execution plan 400 with the lowest cost, as determined by a cost model. The SQL statement shown below is an example of a query that queries for the name of all employees having a salary equal to 100 from a database table "emp_table":

SELECT employee_name
FROM emp_table
WHERE salary=100

In optimizing the SQL statement above, the optimizer generates a first execution plan, which performs a full table scan of emp_table to execute the query. This first execution plan retrieves every row from emp_table to identify particular rows that match the WHERE clause. If an index exists for the "salary" column of emp_table, then the optimizer also generates a second execution plan, which accesses the index to identify rows that match the WHERE clause, and thereafter retrieves only those identified rows from the table.

Figure 5A:
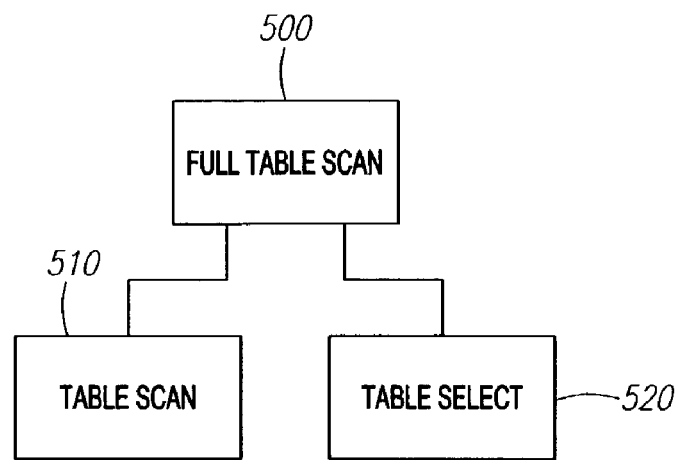
FIG. 5A is a representation of a full table scan execution plan.
Figure 5B:
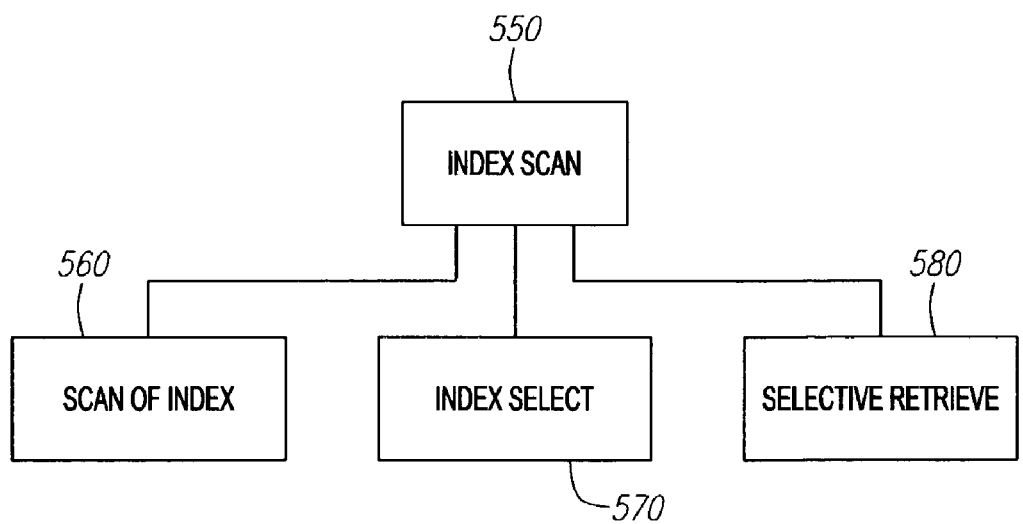
FIG. 5B is a representation of an index scan execution plan.

Each execution plan 400 contains one or more database operations 410. For example, turning to FIGS. 5A–B, the first execution plan 500 includes two database operations 410; a full table scan 510 of emp_table (to retrieve emp_table from the database 132), and a table select 520 (to extract from emp_table the rows that match the WHERE clause). The second execution plan 550 includes three database operations 410, an index scan 560 of the "salary" index (to retrieve the "salary" index from the database 132), an index select 570 (to extract from the salary index the index entries that identify the rows that match the WHERE clause) and a selective retrieve 580 (to retrieve the identified rows from emp_table).

Returning to FIG. 4, each database operation 410 includes several cost values 420 that quantify the various costs incurred in executing the database operation 410, including an I/O cost value 420(1) and a CPU cost value 420(2). The cost values 420 can optionally include other costs, such as network cost, distribution cost, etc.

Figure 6:
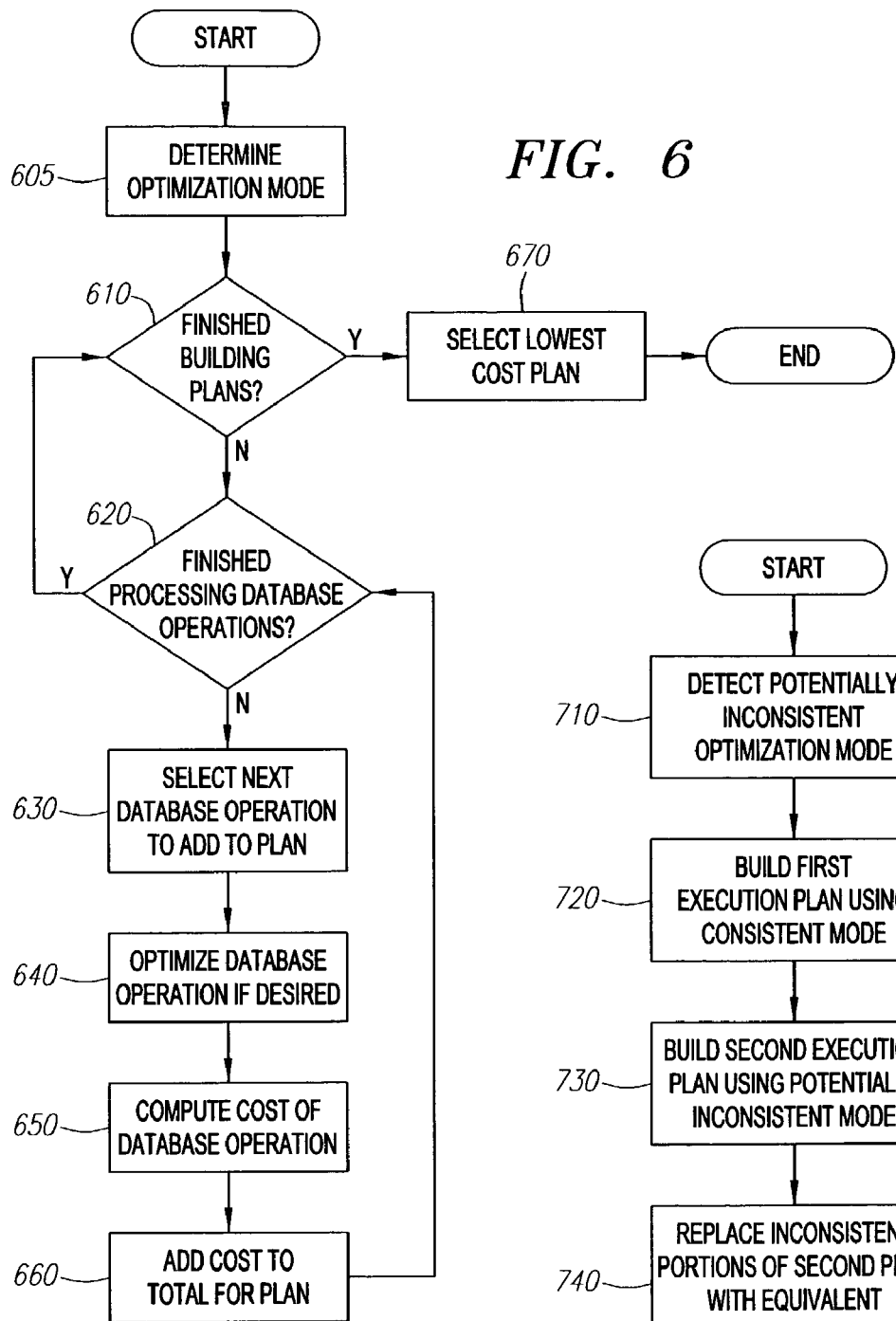
FIG. 6 is a flowchart of a method of optimizing a query using execution plans.

With reference to FIG. 6, the optimizer uses the cost model to compute an optimal execution plan 400 for the query being optimized. At step 605, the optimizer determines the optimization mode to use in optimizing the query. The decision about which optimization mode to use is based on a number of factors, such as an optimization mode instruction provided by a user of the query, or a default optimization mode instruction supplied by the database 132, or a workload-based optimization mode, etc.

At step 610, the optimizer checks to see if all desired execution plans 400 have been built. In deciding which execution plans 400 to build, the optimizer considers a variety of factors, such as the number of possible combinations of database operations 410 that are capable of generating the query result set, the number of possible ways of implementing any given database operation 410, etc. The optimizer may decide to build a separate execution plan 400 for each combination of database operations 410 or implementation way, or the optimizer may make some optimization decisions without building separate execution plans 400, to reduce the number of execution plans 400 that are built.

Assuming that there are execution plans 400 remaining to be built, the optimizer starts building the next execution plan 400 at step 620, where the optimizer checks to see if there are any remaining database operations 410 to be added into the execution plan 400. Assuming there are database operations 410 remaining to be processed, then at step 630 the optimizer analyzes the query and selects the next database operation 410 to add to the execution plan 400. In an embodiment, the optimizer selects the next database operation 410 by conducting a bottom-up construction, beginning with the underlying tables and other base-level inputs to the query, then selecting the database operations 410 that operate on the base-level inputs, and so on, building up to the final output of the query. In an alternate embodiment, the optimizer starts the analysis with the output of the query and works backwards through the database operations 410 that generate the output until the base-level inputs are processed.

At step 640, the selected database operation 410 is optimized where desired. For example, if there are multiple ways of implementing the selected database operation 410, the optimizer selects the optimal way, considering the optimization mode and the inputs to the database operation. When joining tables, for example, there are multiple different join methods available. With some types of input, a nested loop join might be optimal, whereas for other types of input, a hash join might be optimal. Similarly, for a first rows optimization mode, a nested loop join might be optimal, whereas for an all rows optimization mode, a hash join might be optimal. SORT database operations 410 provide another example. For some inputs, a merge sort might be optimal, whereas for other inputs, a bubble sort might be optimal.

At step 650, the cost and the number of rows produced (row count) of the database operation 410 are computed. The optimizer uses statistics gathered on database objects such as tables, columns, and indexes in estimating the row count. These statistics are collected using a database utility, usually either manually by a DBA, or automatically by a scheduled batch job. The statistics include object facts such as the number of rows in a table, the number of blocks used to store table data on disk, the number of distinct values in a table column, etc.

At step 660, the cost is added to the total cost for the execution plan 400 under construction. Control then returns back to step 620 where the next database operation 410 is processed. Once all of the database operations 410 for the execution plan 400 under construction have been processed, then control returns back to step 610, where the next execution plan 400 is processed. Once all of the desired execution plans 400 have been built, then at step 670, the optimizer compares the costs of the various execution plans 400, selects the lowest cost execution plan 400 and forwards this lowest cost plan for execution by the DBMS 131.

For certain optimization modes, as applied to certain database operations 410, the method discussed above may cause the most optimal execution plan 400 not to be built, and thus lead to a non-optimal execution plan 400 being selected. For example, if a database operation 410 is provided with input data optimized according to a first optimization mode, and the database operation 410 has an input parameter that is inconsistent with the first optimization mode, then the resulting execution plan may be sub-optimal. For example, assume that the input to a database operation 410 is optimized according to a first rows optimization mode, but the database operation 410 has an input parameter that specifies the database operation 410 consumes all of its input before creating any output. This type of database operation 410 is referred to as a "blocking operation." To generate optimal output, blocking operations typically use input that is optimized according to an all rows optimization mode. Thus, input optimized according to a first rows optimization mode is inconsistent with the blocking operation.

Figure 7:
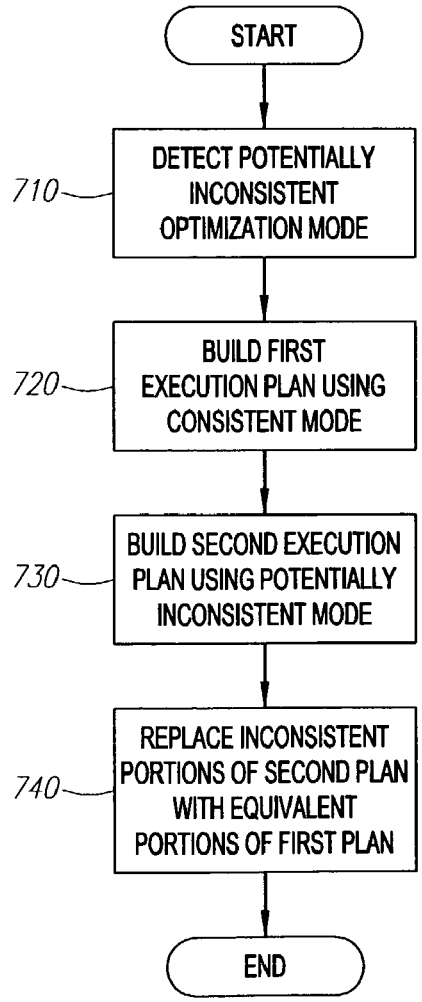
FIG. 7 is a flowchart of a method of building an execution plan including database operations with inconsistent inputs.

To overcome this limitation, the database operations 410 that provide data optimized in a manner inconsistent with the input parameter are replaced with database operations 410 optimized in a manner consistent with the input parameter. Turning to the method of FIG. 7, the optimizer detects a first optimization mode that is potentially inconsistent with input parameters for one or more database operations 410, at step 710. The optimizer then generates an execution plan 400 according to a second optimization mode that is consistent with the one or more database operations 410, at step 720. The optimizer then makes a second pass through the execution plan 400, using the first optimization mode, at step 730. When the optimizer encounters a database operation 410 with an input parameter that is inconsistent with the first optimization mode, the optimizer switches in an equivalent portion of the execution plan 400 as optimized according to the second optimization mode, at step 740. This switched in portion replaces the input that was optimized inconsistently with the input parameter.

Figure 8:
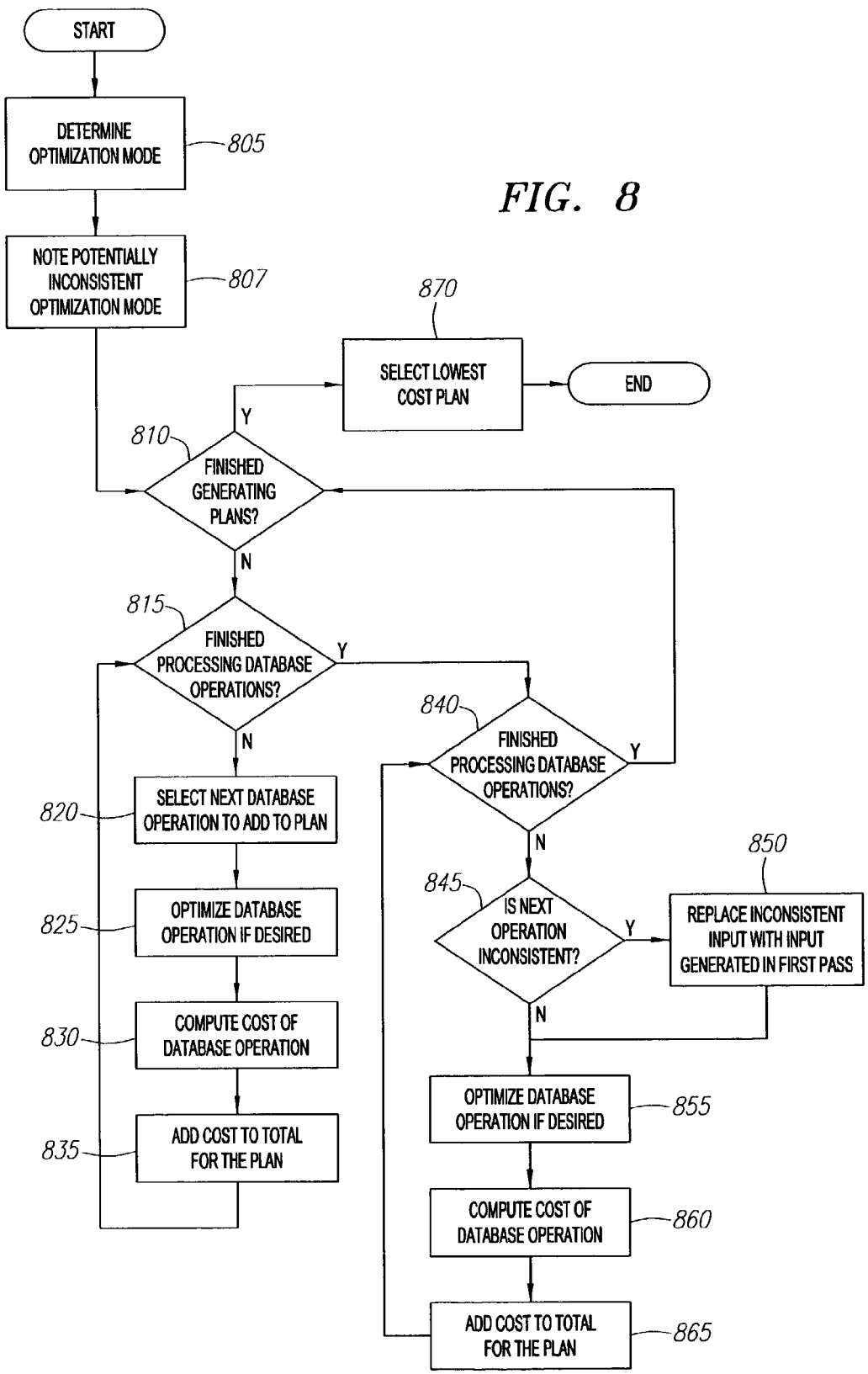
FIG. 8 is a flowchart of a method of building an execution plan using two passes to eliminate inconsistent inputs.

In an embodiment, discussed in more detail using a first rows optimization mode as applied to a blocking operation, the replacement method follows the method of FIG. 8. At step 805 the optimizer selects the optimization mode, based on criteria supplied by the user, pre-defined criteria stored in the DBMS 131, or other ways available to the optimizer for determining optimization modes. Here, a first rows optimization mode is selected. At step 807 the optimizer notes that the first rows optimization mode is inconsistent with blocking operations, so the optimizer commences the two-pass method to build execution plans 400 that properly deal with any blocking operations detected. The optimizer does not yet know whether or not there will be any blocking operations found in any of the execution plans 400 to be built.

At step 810, the optimizer starts generating execution plans 400. The optimizer examines the query and uses the available information about the query, the various components (tables, indexes, subqueries, fields, etc.) of the query, and the environment the DBMS 131 is operating under to decide which execution plans 400 to build. For example, the optimizer considers information about the join orders of the tables joined by the query, information about any indexes available for the tables, information about the data contained in the tables, information about the current workload or the projected workload on the DBMS, etc.

Assuming that the optimizer determines that there are still execution plans 400 remaining to be built, then at step 815 the optimizer begins building the execution plan 400 using the all rows optimization mode, since the all rows optimization mode is consistent with the input parameters of blocking operations. Steps 815–835 follow similarly to steps 620–660 of FIG. 6, discussed above. At step 815, the optimizer checks to see if the plan is completed. Assuming it is not complete, then at step 820 the optimizer selects the next database operation 410 to add to the execution plan 400. At step 825 the optimizer optimizes the selected database operation 410 as desired. At step 830 the optimizer computes the cost of the database operation 410. At step 835 the optimizer adds the cost of the database operation 410 to the total for the execution plan 400.

Once all database operations 410 have been optimized according to the all rows optimization mode and the execution plan 400 has been built, then control passes to step 840, where the optimizer makes a second pass through the execution plan 400, using the first rows optimization mode, starting with the first database operation 410 added to the execution plan 400 in the first pass. At step 845, the optimizer examines the database operation 410 to determine if it has an input parameter that is inconsistent with the first rows optimization mode. If the database operation 410 does have an inconsistent input parameter, then at step 850 the optimizer replaces the input to the database operation 410 with the corresponding input from the first pass (steps 815–835 above) optimized according to the all rows optimization mode.

Once the inputs have been replaced, or if the database operation 410 is not inconsistent with the first rows optimization mode, then at step 855 the optimizer optimizes the database operation 410 according to the first rows optimization mode. For example, if the database operation 410 is a join operation, then the join method is optimized for the first rows optimization mode. This optimization may be different from the optimization performed on the corresponding database operation 410 in the first pass, or it may be the same.

At step 860, the optimizer computes the cost and the row count for the database operation 410. If the database operation 410 is not a blocking operation, then the cost and row count values previously computed at step 830 are prorated based on the number of first rows specified to be optimized for. For example, assume that a query is estimated in the first pass to produce 100 rows of output, and further assume that the user or the application specified that the query should be optimized to produce the first 10 rows quickly. This means that if there are no blocking operations in the execution plan 400, then each database operation 410 should be optimized to produce $1/10^{th}$ of its output rows, and the corresponding cost to produce those rows is computed for each database operation 410. If the database operation 410 is a blocking operation, then the previously-computed input costs and row counts are re-used in the second pass and combined with the cost and row count of the blocking operation as optimized under the first rows optimization mode.

Note that some database operations 410 are non-linear. That is, the cost to produce the Nth row of output is not a constant for all values of N. Thus the proration of these types of database operations is also non-linear. The optimizer uses an appropriate proration function, based on the nature of the database operation 410, to generate more accurate cost and row count estimates.

At step 865, the costs and row counts calculated above are added to the totals for the execution plan 400. Control then passes back to step 840, where the next database operation 410 is processed. Once all database operations have been processed and the second pass through the execution plan is complete, then control passes back to step 810, where the next execution plan is built. Once all the execution plans 400 have been built, at step 870 the optimizer selects the lowest cost execution plan 400 and forwards that plan on to be executed by the DBMS 131.

To assist in understanding the method of an embodiment, the following query will be optimized using the method of FIG. 8:

SELECT T1.X, T2.X
FROM T1, T2, T3
WHERE T1.Y=T2.Y
AND T2.Z=T3.Z
ORDER BY T1.X ASCENDING
OPTIMIZE FIRST ROWS 10

The optimizer builds the execution plans 910, 920, 930, 940 shown in FIG. 9. These execution plans are examples of some of the execution plans built by the optimizer. Other execution plans are also possible, specifying, for example, different database operations, different orderings of database operations, or different join orders.

Turning to the construction of the first execution plan 910, at step 805 the optimizer notes that the user has specified that the query is to be optimized according to the first rows optimization mode, to generate the first 10 rows of output quickly. At step 807, the optimizer notes that the first rows optimization mode is inconsistent with at least one class of database operations (blocking operations), so the optimizer commences the two-pass method, to properly detect and handle any blocking operations discovered while generating the execution plans for the query.

At step 810, the optimizer begins generating execution plans, starting with the first execution plan 910. At step 815, the optimizer begins the first pass for the first execution plan 910, by selecting the GET(T1) database operation as the first database operation in the first execution plan 910. At step 820, the optimizer optimizes the GET(T1) operation according to the all rows optimization mode. At step 825, the optimizer computes the cost (10 units) and the row count (1000 rows) for the GET(T1) operation, and adds these values to the totals for the first pass of the first execution plan 910.

Control returns to step 815, where the optimizer next selects the GET(T2) database operation to add to the first execution plan 910. At step 820, the optimizer optimizes the GET(T2) operation according to the all rows optimization mode. At step 825, the optimizer computes the cost (15 units) and the row count (1000 rows) for the GET(T2) operation, and adds these values to the totals for the first pass of the first execution plan 910.

Figure 10A:
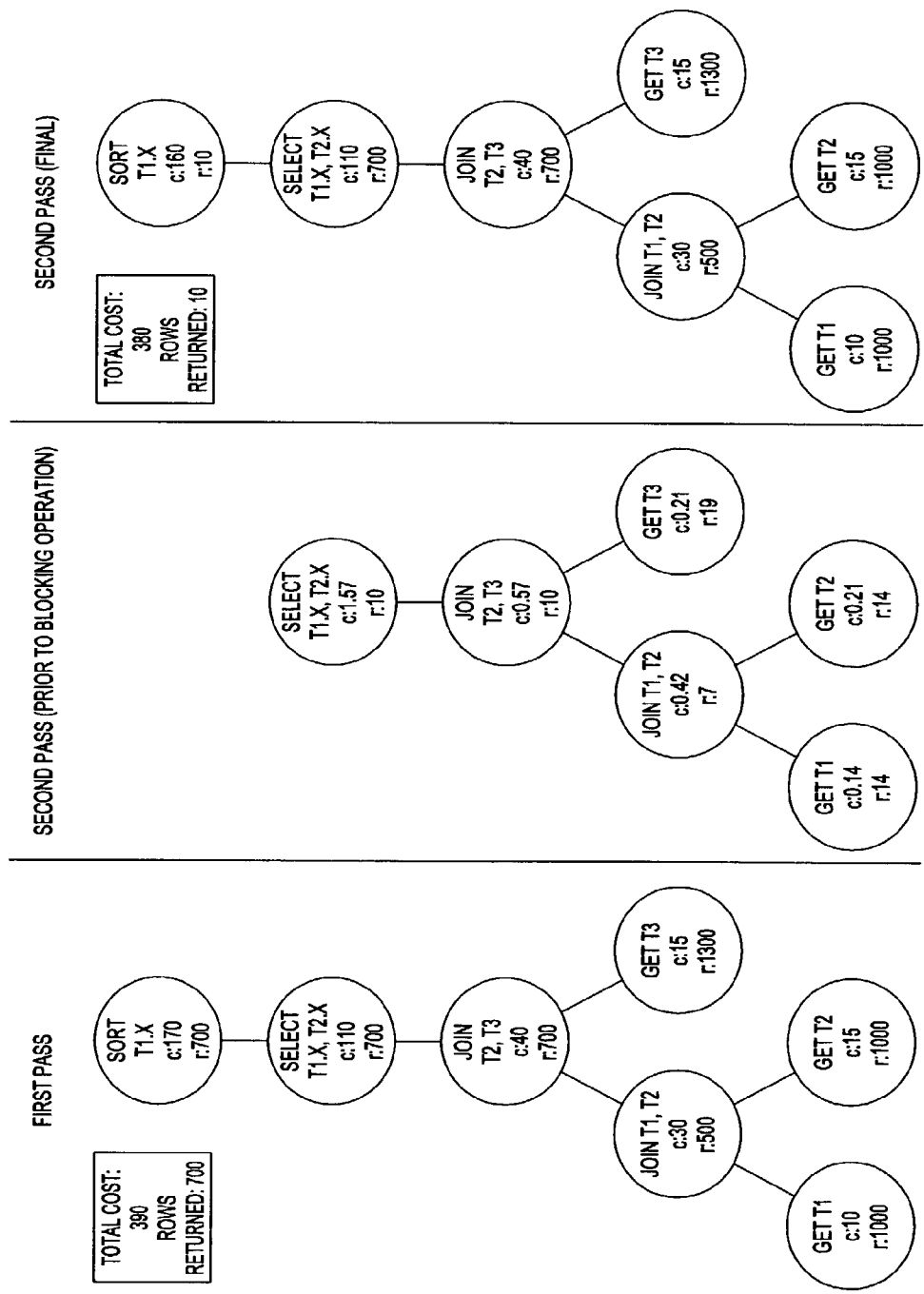
FIG. 10A is a representation of a first execution plan for an example query.

Control again returns to step 815, where the optimizer next selects the JOIN(T1,T2) database operation to add to the first execution plan 910. At step 820, the optimizer optimizes the JOIN(T1,T2) operation according to the all rows optimization mode. For example, the optimizer selects a join method that is optimized for the all rows optimization mode. At step 825, the optimizer computes the cost (30 units) and the row count (500 rows) for the JOIN(T1,T2) operation, and adds these values to the totals for the first pass of the first execution plan 910. The remaining database operations GET(T3), JOIN(T2,T3), SELECT(T1.X, T2.X) and SORT(T1.X) are similarly processed according to steps 815–835 and incorporated into the first execution plan 910. The results of the first pass through the first execution plan 910, including the costs and row counts for each operation as well as the final cost and final row count returned by the query as optimized under the all rows optimization mode are shown in the first column of FIG. 10A.

Once the first pass is completed, then at step 840 the optimizer starts the second pass through the first execution plan 910, using the first rows optimization mode. The second pass begins with the GET(T1) operation, where at step 845 the optimizer checks the GET(T1) operation to see if it is a blocking operation. Since the GET (T1) operation does not need all of its input before starting to generate output, it is not a blocking operation, so control proceeds to step 855, where the GET(T1) operation is optimized to deliver enough output rows to yield 10 rows of final query output quickly. Since the full query produces 700 rows of results, the GET(T1) operation is optimized to produce $10/700$ or $1/70^{th}$ of its full output, as prorated based on the all rows row count from the first pass. Assuming that the GET(T1) operation is a linear operation, this yields a row count of 14, and a cost of 0.14 units, at step 860. This cost is added to the total cost for the second pass, at step 865.

Control returns to step 840, where the GET(T2) operation is selected as the next operation to process. At step 845 the optimizer checks the GET(T2) operation to see if it is a blocking operation. Since the GET (T2) operation does not need all of its input before starting to generate output, it is not a blocking operation, so control proceeds to step 855, where the GET(T2) operation is optimized to deliver enough output rows to yield 10 rows of final query output quickly. Assuming that the GET(T2) operation is a linear operation, this yields a row count of 14, and a cost of 0.21 units, at step 860. This cost is added to the total cost for the second pass, at step 865.

Control returns to step 840, where the JOIN(T1,T2) operation is selected as the next operation to process. At step 845 the optimizer checks the JOIN(T1,T2) operation to see if it is a blocking operation. Since the JOIN(T1,T2) operation does not need all of its input before starting to generate output, it is not a blocking operation, so control proceeds to step 855, where the JOIN(T1,T2) operation is optimized to deliver enough output rows to yield 10 rows of final query output quickly. Assuming that the JOIN(T1,T2) operation is a linear operation, this yields a row count of 7, and a cost of 0.42 units, at step 860. This cost is added to the total cost for the second pass, at step 865. The GET(T3), JOIN(T2,T3) and SELECT(T1.X,T2.X) database operations are processed similarly according to steps 840–865, yielding the costs and row counts shown in the second column of FIG. 10A.

The optimizer then returns to step 845, where the SORT (T1.X) database operation is selected as the next operation to process. At step 845, the optimizer discovers that the SORT(T1.X) operation is a blocking operation, and therefore is inconsistent with the first rows optimization mode. At step 850, the optimizer replaces the entire sub-tree under the SORT(T1.X) operation with the corresponding sub-tree generated in the first pass, using the all rows optimization mode. At step 855 the optimizer optimizes the SORT(T1.X) operation under the first rows optimization mode. At step 860 the optimizer computes the cost (160 units) and row count (10) for the SORT(T1.X) operation, and at step 865 adds the cost to the total for the second pass, as modified by the sub-tree replacement. The final tree for the first execution plan 910 is shown in the third column of FIG. 10A. Since the SORT (T1.X) operation is the last operation in the first execution plan 910, it is the only operation to be optimized under the first rows optimization mode. Once the optimizer finishes building the first execution plan 910, then control returns back to step 810 for construction of the second execution plan 920.

Figure 10B:
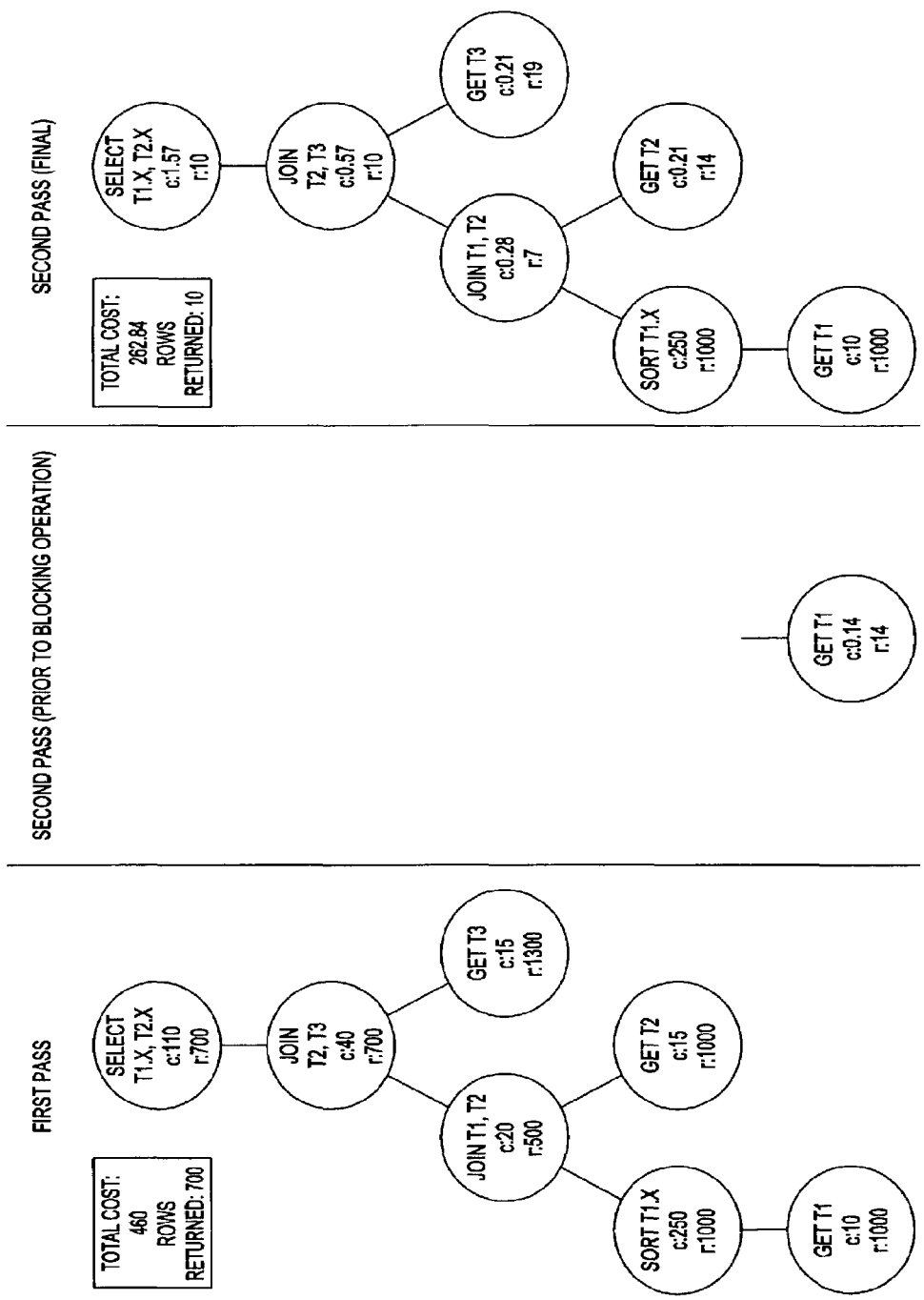
FIG. 10B is a representation of a second execution plan for an example query.

The optimizer first optimizes the second execution plan 920 according to the all rows optimization mode to build the plan tree shown in the first column of FIG. 10B. The optimizer then begins the second pass, optimizing the second execution plan 920 according to the first rows optimization mode. The optimizer processes the GET(T1) operation, then encounters the SORT(T1.X) operation. The optimizer replaces the first rows optimized GET(T1) operation with the all rows optimized GET(T1) operation from the first pass, and then proceeds on through the execution plan, optimizing the remaining database operations according to the first rows optimization mode. The stages of the optimization of the second execution plan 920 are shown in FIG. 10B.

Figure 10C:
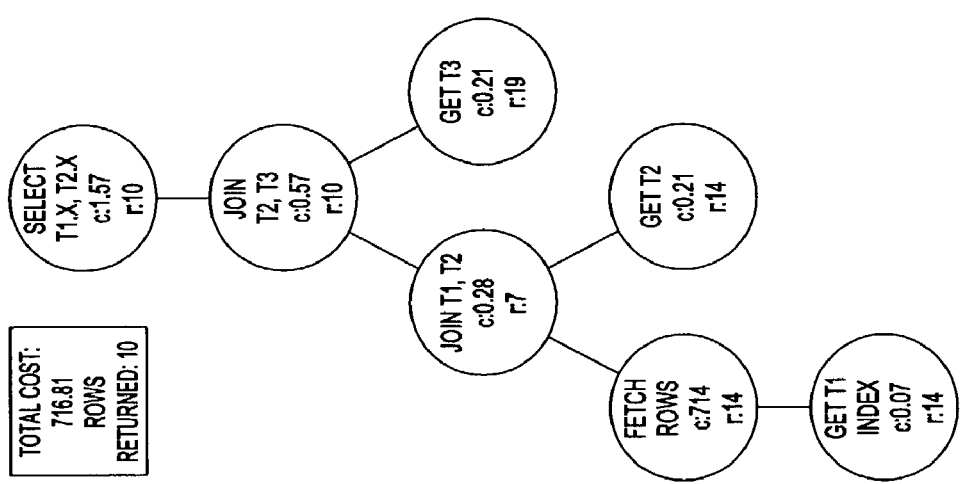
FIG. 10C is a representation of a third execution plan for an example query.
Figure 10C:
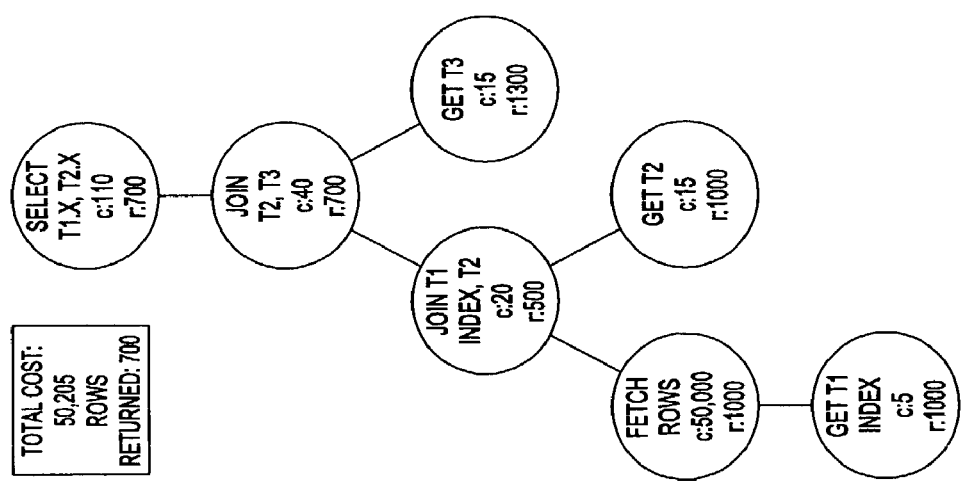
Figure 10D:
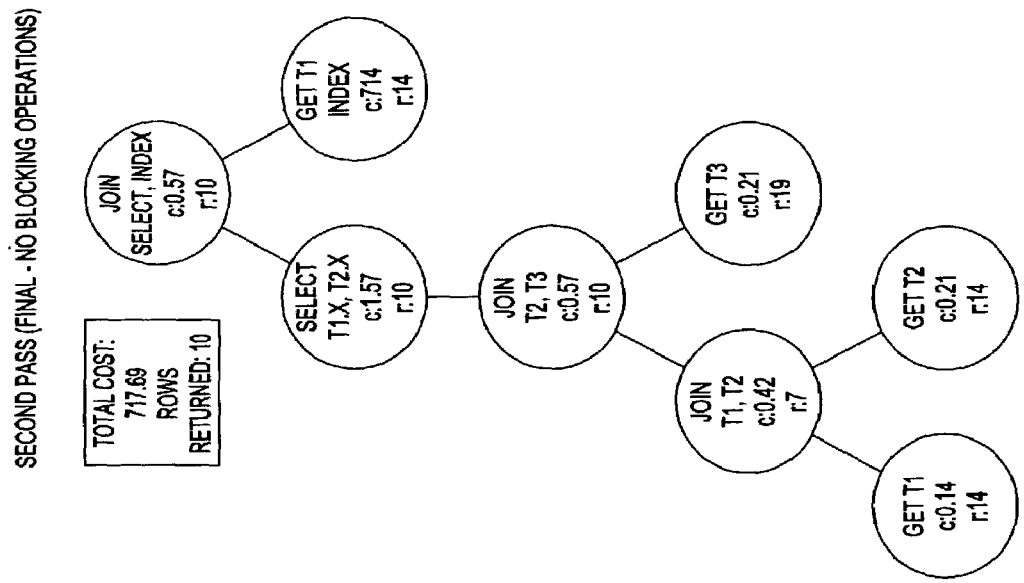
FIG. 10D is a representation of a fourth execution plan for an example query.
Figure 10D:
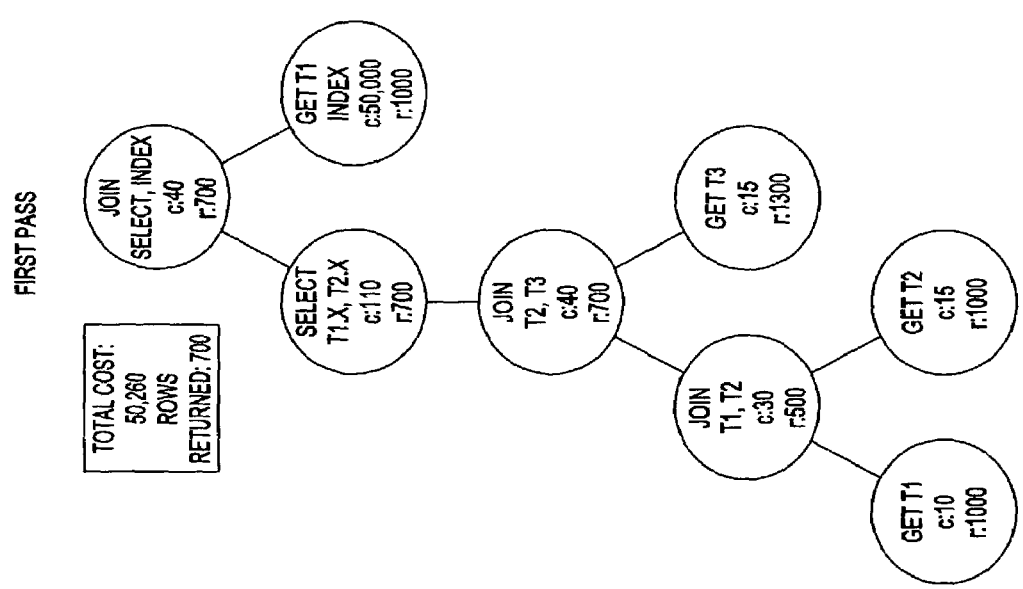

Once the optimizer builds the second execution plan, then control returns to step 810, where the third execution plan 930 and fourth execution plan 940 are processed as discussed above. The stages of optimization of the third execution plan 930 are shown in FIG. 10C. The stages of optimization of the fourth execution plan 940 are shown in FIG. 10D. Once all of the desired execution plans have been built, then at step 870, the optimizer compares the costs of each plan and selects the second execution plan 920 for execution, since it has a lower cost than the other execution plans 910, 930, 940.

Figure 11:
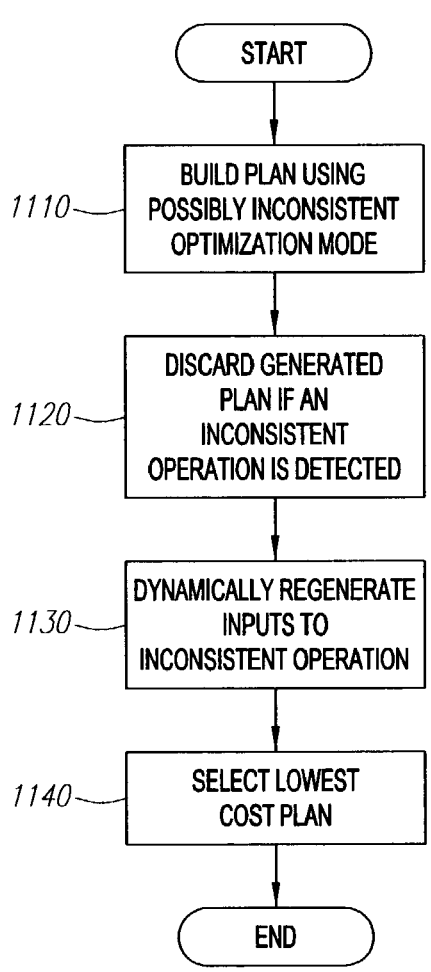
FIG. 11 is a flowchart of a method of building an execution plan including database operations with inconsistent inputs, using dynamic regeneration.

In an alternate embodiment, shown in FIG. 11, instead of first generating the entire execution plan according to the all rows optimization mode, the optimizer first generates the execution plan using the first rows optimization mode, at step 1110. When the optimizer encounters a blocking operation, it discards the generated portion of the execution plan, at step 1120, and dynamically regenerates that portion of the execution plan according to the all rows optimization mode at step 1130. This process is repeated each time a blocking operation is encountered. Finally, at step 1140 the optimal execution plan is selected for execution.

Figure 12:
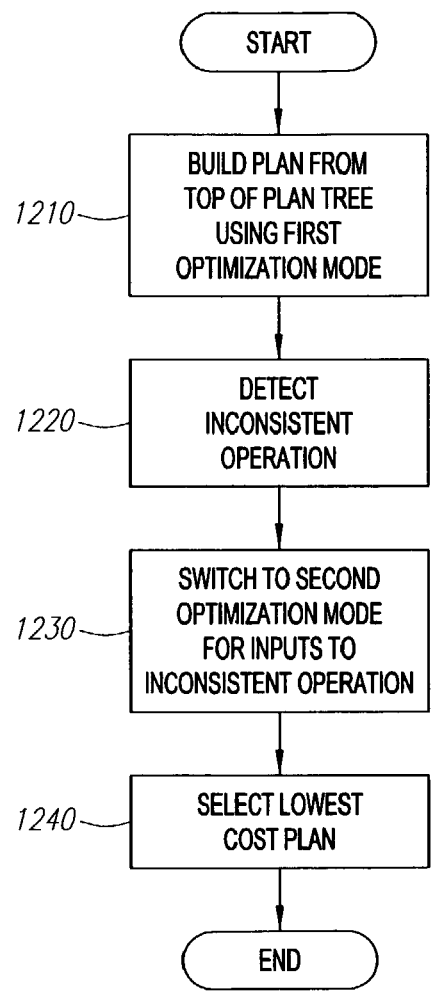
FIG. 12 is a flowchart of a method of building an execution plan including database operations with inconsistent inputs, using a top-down approach.

In another alternate embodiment, shown in FIG. 12, the execution plans are built in a top-down order. The optimizer starts with the final operation in the execution plan, which will provide the query results set, at step 1210. The optimizer optimizes the execution plan according to the first rows optimization mode. The optimizer works backwards through the execution plan, optimizing according to the first rows mode, until a blocking operation is encountered, at step 1220. Once the optimizer has encountered a blocking operation, then the optimizer knows that the remainder of the execution plan is to be optimized according to the all rows optimization mode, therefore the optimizer switches modes at step 1230. Once all the desired execution plans have been generated, then at step 1240 the optimizer selects the lowest cost plan for execution. This top down method can also be used with either the two-pass or the one-pass (dynamic regeneration) methods discussed above, as desired.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense, and the invention is not to be restricted or limited except in accordance with the following claims and their legal equivalents.

I claim:

1. A computer implemented method of optimizing a query, the query comprising a blocking operation, the blocking operation corresponding to an equivalent non-blocking operation, the method comprising:

receiving the query;

optimizing the query in a first plan according to a cost-based optimization scheme, wherein the cost-based optimization scheme optimizes the query to lower an execution cost of delivery of a subset of a query results set;

retaining the blocking operation in the first plan if using the blocking operation results in a lower execution cost than using the non-blocking operation;

replacing the blocking operation in the first plan with the non-blocking operation if using the blocking operation results in a higher execution cost than using the non-blocking operation; and forwarding the optimized first query plan for execution.

2. The method of claim 1, wherein optimizing the query further comprises:

creating a first execution plan according to a first optimization mode during a first iteration comprising the blocking operation;

modifying the first execution plan according to a second optimization mode during a second iteration, wherein the non-blocking operation replaces the blocking operation; and estimating the execution cost of the first execution plan.

3. The method of claim 2, wherein the second optimization mode comprises an all rows optimization mode.

4. The method of claim 2, wherein modifying the first execution plan according to the second optimization mode comprises dynamically optimizing the first execution plan according to the second optimization mode.

5. The method of claim 2, wherein modifying the first execution plan according to the second optimization mode comprises one or more pre-optimized database operations.

6. The method of claim 5, wherein the one or more pre-optimized database operations comprise a sub-tree of a second execution plan optimized according to the second optimization mode.

7. The method of claim 2, wherein the first optimization mode comprises a first rows optimization mode.

8. The method of claim 1, wherein the first plan comprises an execution plan including a tree.

9. The method of claim 8, wherein the query includes a plurality of database operations that comprise a plurality of nodes in the tree.

10. The method of claim 1, wherein the query includes a plurality of database operations, and wherein a first one or more of the plurality of database operations comprises one or more database operations providing input data to a second one of the plurality of database operations, the second one of the plurality of database operations comprising an input parameter inconsistent with the provided input data.

11. The method of claim 10, wherein the provided input data is optimized according to a first rows optimization scheme and the input parameter specifies that the second one of the plurality of database operations consumes all input before providing any output.

12. The method of claim 10, wherein the first one or more of the plurality of database operations comprises a sub-tree of the second one of the plurality of database operations.

13. The method of claim 1, further comprising:

optimizing the query in a second execution plan using the cost-based optimization scheme, wherein the cost-based optimization scheme according to a first optimization mode optimizes the query to lower an execution cost of delivery of a subset of a query results set;

retaining an operation in the second execution plan, if according to a second mode of optimization retaining the operation results in a lower execution cost than replacing the operation;

replacing the operation in the second execution plan, if according to a second mode of optimization replacing the operation results in a lower execution cost than retaining the operation; and forwarding the optimized second execution plan for execution.

14. The method of claim 13, further comprising:

selecting for execution the lowest cost execution plan for the query.

15. The method of claim 13, wherein optimizing the query further comprises:

creating the second execution plan according to a first mode of optimization during a first iteration comprising the operation;

modifying the second execution plan according to a second mode of optimization during a second iteration, wherein the a second operation replaces the operation; and estimating the execution cost of the second execution plan.

16. A computer-usable storage medium comprising a sequence of instructions that is executed by a processor, and causes the processor to perform a method of optimizing a query, the query comprising a blocking operation, the blocking operation corresponding to an equivalent nonblocking operation, the method comprising:

receiving the query;

optimizing the query in a first plan according to a cost-based optimization scheme, wherein the cost-based optimization scheme optimizes the query to lower an execution cost of delivery of a subset of a query results set;

retaining the blocking operation in the first plan if using the blocking operation results in a lower execution cost than using the non-blocking operation;

replacing the blocking operation in the first plan with the non-blocking operation if using the blocking operation results in a higher execution cost than using the non-blocking operation; and forwarding the optimized first query plan for execution.

17. The computer-useable storage medium of claim 16, wherein optimizing the query further comprises:

creating a first execution plan according to a first optimization mode during a first iteration comprising the blocking operation;

modifying the first execution plan according to a second optimization mode during a second iteration, wherein the non-blocking operation replaces the blocking operation; and estimating the execution cost of the first execution plan.

18. The computer-useable storage medium of claim 17, wherein the first optimization mode comprises a first rows optimization mode, and wherein the second optimization mode comprises an all rows optimization mode.

19. The computer-useable storage medium of claim 16, further comprising:

optimizing the query in a second execution plan using the cost-based optimization scheme, wherein the cost-based optimization scheme according to a first optimization mode optimizes the query to lower an execution cost of delivery of a subset of a query results set;

retaining an operation in the second execution plan, if according to a second mode of optimization retaining the operation results in a lower execution cost than replacing the operation;

replacing the operation in the second execution plan, if according to a second mode of optimization replacing the operation results in a lower execution cost than retaining the operation; and forwarding the optimized second execution plan for execution.

20. The computer-useable storage medium of claim 19, wherein optimizing the query further comprises:

creating the second execution plan according to a first mode of optimization during a first iteration comprising the operation;

modifying the second execution plan according to a second mode of optimization during a second iteration, wherein the a second operation replaces the operation; and estimating the execution cost of the second execution plan.

21. The computer-useable storage medium of claim 16, wherein the query includes a plurality of database operations, and wherein a first one or more of the plurality of database operations comprises one or more database operations providing input data to a second one of the plurality of database operations, the second one of the plurality of database operations comprising an input parameter inconsistent with the provided input data.

22. The computer-useable storage medium of claim 21, wherein the provided input data is optimized according to a first rows optimization scheme and the input parameter specifies that the second one of the plurality of database operations consumes all input before providing any output.

23. The computer-useable storage medium of claim 21, wherein the input parameter specifies that the database operation consumes all input before providing any output.

24. A system for optimizing a query, the query comprising a blocking operation, the blocking operation corresponding to an equivalent non-blocking operation, the system comprising:

a processing component;

means for receiving the query;

means for optimizing the query in a first plan according to a cost-based optimization scheme, wherein the cost-based optimization scheme optimizes the query to lower an execution cost of delivery of a subset of a query results set;

means for retaining the blocking operation in the first plan if using the blocking operation results in a lower execution cost than using the non-blocking operation;

means for replacing the blocking operation in the first plan with the non-blocking operation if using the blocking operation results in a higher execution cost than using the non-blocking operation; and means for forwarding the optimized first query plan for execution.

25. The system of claim 24, wherein the means for optimizing the query further comprises:

means for creating a first execution plan according to a first optimization mode during a first iteration comprising the blocking operation;

means for modifying the first execution plan according to a second optimization mode during a second iteration, wherein the non-blocking operation replaces the blocking operation; and means for estimating the execution cost of the first execution plan.

26. The system of claim 25, wherein the first optimization mode comprises a first rows optimization mode.

27. The system of claim 25, wherein the means for modifying the first execution plan according to the second optimization mode comprises a means for dynamically optimizing the first execution plan according to the second optimization mode.

28. The system of claim 25, wherein the means for modifying the first execution plan according to the second optimization mode comprises one or more pre-optimized database operations.

29. The system of claim 28, wherein the one or more pre-optimized database operations comprise a sub-tree of a second execution plan optimized according to the second optimization mode.

30. The system of claim 25, wherein the second optimization mode comprises an all rows optimization mode.

31. The system of claim 24, wherein the first plan comprises an execution plan including a tree.

32. The system of claim 31, wherein the query includes a plurality of database operations that comprise a plurality of nodes in the tree.

33. The system of claim 24, wherein the query includes a plurality of database operations, and wherein a first one or more of the plurality of database operations comprises one or more database operations providing input data to a second one of the plurality of database operations, the second one of the plurality of database operations comprising an input parameter inconsistent with the provided input data.

34. The system of claim 33, wherein the provided input data is optimized according to a first rows optimization scheme and the input parameter specifies that the second one of the plurality of database operations consumes all input before providing any output.

35. The system of claim 33, wherein the first one or more of the plurality of database operations comprises a sub-tree of the second one of the plurality of database operations.

* * * * *